June 5, 1956   C. M. TURSKY   2,748,950
FLUID FILTER
Filed Sept. 13, 1951
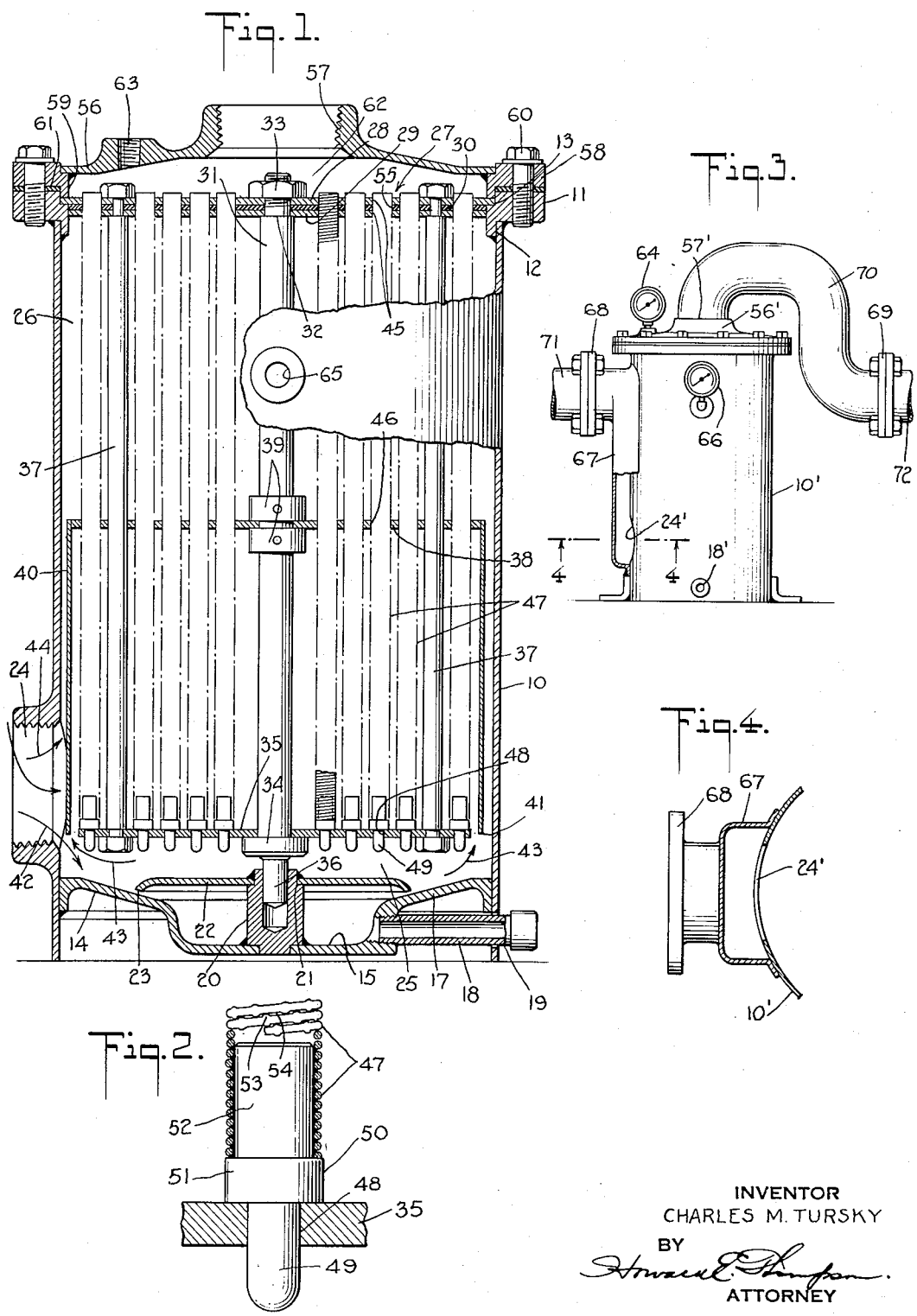
INVENTOR
CHARLES M. TURSKY
BY
Howard E. Thompson
ATTORNEY

United States Patent Office 2,748,950
Patented June 5, 1956

2,748,950

FLUID FILTER

Charles M. Tursky, Neshanic, N. J.

Application September 13, 1951, Serial No. 246,355

5 Claims. (Cl. 210—184)

This invention relates to filters, particularly for use in filtering gasoline and similar liquids or fluids. More particularly, the invention deals with a filter device, comprising a casing with a filter unit arranged therein and detachable through one end of the casing to facilitate cleaning and repair. Still more particularly, the invention deals with a filter device of the character described, wherein means is provided to divert the flow of fluid, so as to directly contact both lower and upper sections of the filter elements in order to increase the efficiency of the filter in the use thereof.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal sectional view through a filter made according to my invention, diagrammatically illustrating the filter elements for the most part in dot and dash lines and showing part of the construction in elevation.

Fig. 2 is en enlarged sectional detail view of one end portion of one of the filter elements and showing the mounting plug therefor in elevation.

Fig. 3 is a side view of a modified form of installation with part of the construction broken away and in section; and Fig. 4 is an enlarged sectional detail view on the line 4—4 of Fig. 3.

In Fig. 1 of the drawing, I have shown at 10 the casing of my improved filter, the casing having, fixed to the upper end thereof, a mounting ring or flange 11, including a portion 12, which fits within the casing, the ring or flange having an annular seat, as at 13.

Mounted in the lower portion of the casing 10 is an inwardly set bottom wall 14, having a center downwardly extending drain pit 15, which joins the peripheral wall in a downwardly bevelled wall portion 17. With this construction, sediment can drop into the pit 15. A drain or clean-out pipe 18 communicates with one side of the pit 15 and extends outwardly through the casing 10, as is indicated at 19.

Secured to the bottom of the pit 15 is an upwardly extending tubular center bearing 20, recessed at its upper end, as seen at 21. Mounted in this recess is a baffle plate 22, having a downwardly turned peripheral edge 23, which is spaced from the wall 17. The plate 22 prevents direct action upon the sediment in the pit 15 in the flow of fluid into the casing 10 through the admission opening 24 at one side of the lower portion thereof.

For purposes of description, the casing 10 will be said to have a lower chamber 25 and an upper chamber 26. At 27 I have shown a filter unit which is detachable with respect to the casing 10 through the upper open end thereof.

The unit 27 comprises a top plate 28 which is adapted to be arranged upon the seat 13 and a supplemental top plate 29, which fits snugly within the portion 12 of the ring or flange 11. Between the plates 28 and 29 is a gasket 30 of any suitable material.

At 31 is shown a center bolt or shaft, having a shoulder 32 at its upper end, upon which the plates 28 and 29 are securely clamped by a nut 33. The lower end portion of the shaft 31 has an enlarged collar 34, upon which a bottom plate 35 seats and, below the collar 34, is a reduced extension 36 which fits snugly in the bearing 20. The upper and lower plates 28—29 and 35 are further secured together and reinforced by a series of four or more bolts 37, two of which are shown in Fig. 1 and these bolts serve to position and space the upper and lower plates one with respect to the other.

Centrally of the unit 27 is arranged a partition plate 38 which is positioned on the shaft 31 by a pair of collars 39 fixed to the shaft by pins or otherwise. The partition plate 38 is slightly less in diameter than the diameter of the supplemental top plate 29, but greater in diameter than the bottom plate 35. Secured to the peripheral edge of the partition plate 38 is a baffle sleeve or skirt 40 which extends from the plate 38 downwardly to a point adjacent and outwardly spaced from the plate 35, as seen at 41. In this connection, it will also be noted that the plate 35, as well as the end 41, are arranged above the lower portion of the admission opening 24, so that fluid will enter the lower chamber 25, as indicated by arrow 42 and pass upwardly into the baffle 40 at the periphery of the plate 35, as seen by the arrows 43. On the other hand, the other flow of the fluid passes upwardly into the chamber 26 around the outside of the baffle 40, as indicated by the arrow 44.

The plates 28—29 have vertically alined common diameter apertures 45, 45, respectively, for the reception of a multiplicity of filter elements 47, indicated diagrammatically, for the most part, by dot and dash lines, and the lower end portion of one of these elements being shown in enlarged detail in Fig. 2 of the drawing.

The plate 35 has, in vertical alinement with the apertures 45, 45, smaller diameter apertures 48 for reception of lower reduced ends 49 of plugs 50. The plugs 50 have collars 51 which seat upon the plate 35 and slightly reduced upwardly protruding ends 52, on which the lower ends of the elements 47 are soldered, braised or otherwise secured. Each of the filter elements 47 comprise coil spring bodies, having circumferentially spaced projections 53 thereon, so as to form, between the adjacent windings of the coils, filter passages 54, the showing of which is exaggerated in Fig. 2 for sake of clarity. These filter passages are, in fact, extremely small and are controlled to govern the degree of filterization required, or the type of fluid being filtered. It will be understood that the filter elements 47 pass freely through the partition plate 38 and are also free to yieldably move through the apertures 45 of plates 28 and 29 and, under slight tension, through the corresponding apertures 55 in the gasket 30, thus effecting a seal at the gasket which insures flow of liquid through all of the elements 47. This construction also facilitates movement of the elements to compensate for expansion and contraction which may prevail.

With the foregoing construction, it will be understood that the elements 47, between the several plates, are free to flex and this flexure aids in freeing foreign particles to facilitate collection thereof in the pit 15.

Arranged upon the top ring or flange 11 is a cover plate 56 which has a center discharge opening 57 and an annular enlarged flange or ring portion 58 secured thereto, the latter having a downwardly projecting annular ring 59 which fits within the ring or flange 11 and is adapted to seat upon the plate 28. The cover is secured in position by a series of screws 60 and a gasket 61 is disposed beween the flanges 11 and 58 in order to effect a seal. The cover 56 is slightly domed to form an exhaust or discharge chamber 62, with which the interior or bore of all of the elements 47 communicate, so as to provide a free flow of the filtered fluid out through the discharge 57.

The cover 56 has a threaded aperture 63 for the reception of a pressure gauge as, for example, the gauge 64 shown in Fig. 3 of the drawing. The wall of the casing 10 has a similar aperture 65 communicating with the chamber 26 and a pressure gauge such, for example, as the gauge 66 which, in Fig. 3, is adapted to be coupled therewith. In this way, readings may be taken with respect to pressures of the fluid from the standpoint of the admission side and the exhaust or filtered side of the device.

In the use of the device, it will be apparent that some of the fluid introduced into the intake 24 will pass into the chamber 25 and be filtered through the lower portion of the elements 47, in other words, the elements below the partition plate 38; whereas, the remainder of the fluid will pass upwardly into chamber 26 and filter directly through the upper portion of the elements 47 above the partition plate 38. This arrangement will increase the efficiency of the device or apparatus.

In Figs. 3 and 4 of the drawing, I have shown a slight modification of the structure shown in Figs. 1 and 2, wherein the filter casing 10' is modified simply to the extent of providing a jacket or housing 67 on one wall thereof and communicating with an intake 24' which would be equivalent to the intake 24 and, with this construction, the drain pipe 18' is shown in a position at right angles to the pipe 18, as appearing in Fig. 1; otherwise, the filter device of Fig. 3 is the same and includes, for example, a cover plate 56', similar to the plate 56.

The housing 67 is employed to extend a flanged inlet portion 68 to a high point on the filter to aline with or substantially aline with the flange end 69 of a discharge tube 70, which couples with the outlet portion 57' of the cover 56'. The showing of the tube or pipe 70 is diagrammatic. At 71 I have shown a fluid intake pipe which is coupled with the flange 68 and, at 72, a discharge pipe which is coupled with the flange 69.

The structure of Figs. 3 and 4 is adaptable primarily to suit predetermined installations; whereas, in other instances, the inlet and outlets may extend from one source and directed to another delivery point that is remote from the point of admission.

While I have stated that my improved filter device or apparatus is designed primarily for use in filtering gasoline, it is to be understood that the same is to be utilized in filtering fluids of any type or kind.

The filter elements 47 employed in the filter unit may be in accordance with the teachings in my prior Patent Number 2,458,118 or in accordance with the disclosure in my co-pending applications, Serial Numbers 183,553; filed September 7, 1950, now Patent No. 2,667,272, dated January 26, 1954 and 214,737; filed March 9, 1951, now Patent No. 2,737,299, dated March 6, 1956, respectively.

The present invention deals more particularly with the filter unit as a whole and the manner of mounting the filter elements so that, between the supports 29, 38 and 38, 35, the elements are capable of flexibility when subjected to vibratory action which aids in displacing foreign products therefrom for collection in the pit 15.

Having fully described my invention, what I claim as new and desire to secure by Letters Patent is:

1. A liquid filter of the character described, comprising an elongated casing, an inwardly set bottom wall secured to and closing one end of the casing, said bottom wall having a sediment pit, the other end of the casing being open, means at the lower portion of the casing forming an inlet for liquid to be filtered, a filter unit detachable from the casing through the open end thereof, a cover closing the open end of the casing and retaining the unit in position in said casing, said cover having means for discharging filtered liquid from the casing, said unit comprising upper and lower plates, means for supporting said plates in spaced relationship to each other, a plurality of tubular filter elements supported in said plates and extending therebetween, said detachable cover forming, above the upper plate of said unit, a chamber communicating with the discharge of said cover, all of said tubular filter elements opening into said chamber, means within the casing and fixed on said plate spacing means intermediate the top and bottom plates of said unit for positioning said tubular filter elements intermediate said plates, and said last named means including a skirt extending to a position adjacent said lower plate.

2. A liquid filter of the character described, comprising an elongated casing, an inwardly set bottom wall secured to and closing one end of the casing, said bottom wall having a sediment pit, the other end of the casing being open, means at the lower portion of the casing forming an inlet for liquid to be filtered, a filter unit detachable from the casing through the open end thereof, a cover closing the open end of the casing and retaining the unit in position in said casing, said cover having means for discharging filtered liquid from the casing, said unit comprising upper and lower plates, means for supporting said plates in spaced relationship to each other, a plurality of tubular filter elements supported in said plates and extending therebetween, said detachable cover forming, above the upper plate of said unit, a chamber communicating with the discharge of said cover, all of said tubular filter elements opening into said chamber, means within the casing mounted on said plate spacing means intermediate the top and bottom plates of said unit for positioning said tubular filter elements intermediate said plates, said last named means comprising a transverse partition plate, a tubular baffle sleeve attached to the periphery of said partition plate and spaced from the casing and filter elements, and said partition plate and tubular baffle sleeve dividing the casing into upper and lower filter chambers.

3. A liquid filter of the character described, comprising an elongated casing, an inwardly set bottom wall secured to and closing one end of the casing, said bottom wall having a sediment pit, the other end of the casing being open, means at the lower portion of the casing forming an inlet for liquid to be filtered, a filter unit detachable from the casing through the open end thereof, a cover closing the open end of the casing and retaining the unit in position in said casing, said cover having means for discharging filtered liquid from the casing, said unit comprising upper and lower plates, means for supporting said plates in spaced relationship to each other, a plurality of tubular filter elements supported in said plates and extending therebetween, said detachable cover forming, above the upper plate of said unit, a chamber communicating with the discharge of said cover, all of said tubular filter elements opening into said chamber, means within the casing mounted on said plate spacing means intermediate the top and bottom plates of said unit for positioning said tubular filter elements intermediate said plates, said last named means comprising a transverse partition plate, a tubular baffle sleeve attached to the periphery of said partition plate and spaced from the casing and filter elements, said partition plate and tubular baffle sleeve dividing the casing into upper and lower filter chambers, and said tubular baffle sleeve extending over part of the liquid inlet for said casing.

4. A liquid filter of the class described, comprising a casing open at one end, the other closed end portion of the casing having an intake for admitting liquid to be filtered, a cover closing the open end of the casing, said cover having a discharge passage for removal of filtered liquid from the casing, a filter unit detachable from the casing through the open end thereof upon removal of said cover, said unit comprising a multiplicity of tubular filter coils, plugs secured to one end portion of the coils, a plate supporting said plugs to arrange the coils in spaced relationship to each other, a pair of apertured plates, the other open ends of said coils being yieldably supported in the apertures of said plates, said pair of plates having a gasket therebetween for sealing the coils in their passage through said plates, means for retaining said first named plate and said pair of plates in predetermined spaced relationship to each other, and maintaining the plates and coils in unit assemblage, said last named means comprising a center shaft extending beyond the first named plates, means at the closed end portion of the casing for definitely positioning the shaft and said unit in the casing, means at the closed end portion of the casing for collecting and draining sediment from said casing, means for dividing the casing into upper and lower filter chambers, said last named means comprising a transverse partition plate, a tubular baffle sleeve attached to the periphery of said partition plate and spaced from the casing and filter elements, and said partition plate and tubular baffle sleeve dividing the casing into upper and lower chambers.

5. In liquid filters of the class described, employing a casing having means for admitting liquid to be filtered and for discharging filtered liquid therefrom, a filter unit detachable from said casing, said unit comprising a pair of spaced plates, means for coupling and spacing said plates one with respect to the other, said plates having alined apertures, plugs mounted in the apertures of one of said plates, coil spring filter elements mounted on said plugs and extending through opposed apertures of the other plate, means associated with said last named plate for effecting a seal around each of the filter elements extending through the apertures of said second named plate, a transverse partition plate mounted on said plate coupling and spacing means intermediate said pair of plates, a tubular baffle sleeve attached to the periphery of said partition plate and spaced from the casing and filter elements, and said partition plate and tubular baffle sleeve dividing said casing into upper and lower filter chambers.

References Cited in the file of this patent

UNITED STATES PATENTS

| | | |
|---|---|---|
| 427,906 | Purdy | May 13, 1890 |
| 654,592 | Barr | July 31, 1900 |
| 1,471,807 | Roosevelt et al. | Oct. 23, 1923 |
| 1,580,470 | Duby | Apr. 13, 1926 |
| 1,640,698 | Forsberg | Aug. 30, 1927 |
| 1,823,171 | Hele-Shaw et al. | Sept. 15, 1931 |
| 1,866,970 | Garland et al. | July 12, 1932 |
| 2,065,263 | Beldam | Dec. 2, 1936 |
| 2,065,384 | Lomax | Dec. 22, 1936 |
| 2,108,087 | Thayer | Feb. 15, 1938 |
| 2,276,969 | Heinichen | Mar. 17, 1942 |
| 2,301,439 | Malanowski | Nov. 10, 1942 |
| 2,354,150 | Skinner | July 18, 1944 |
| 2,405,838 | Lawson et al. | Aug. 13, 1946 |
| 2,458,118 | Tursky | Jan. 4, 1949 |
| 2,487,769 | Ebert et al. | Nov. 8, 1949 |
| 2,507,125 | Townsend | May 9, 1950 |
| 2,605,903 | Schuller | Aug. 5, 1952 |

FOREIGN PATENTS

| | | |
|---|---|---|
| 643,172 | France | Dec. 3, 1929 |
| 981,533 | France | May 28, 1951 |
| 370,677 | Italy | Apr. 26, 1939 |